United States Patent [19]

Holstein

[11] 4,307,687
[45] Dec. 29, 1981

[54] INTERNAL COMBUSTION ENGINES

[76] Inventor: Edward Holstein, 284 Rouge Rd., Winnipeg, Manitoba, Canada

[21] Appl. No.: 101,416

[22] Filed: Dec. 10, 1979

[51] Int. Cl.³ .......................... F02B 75/20; F01L 3/06; F02B 25/12
[52] U.S. Cl. .............................. 123/59 EC; 123/53 A; 123/188 VA
[58] Field of Search .............. 123/59 R, 59 EC, 53 R, 123/53 A, 188 R, 188 VA, 70 R

[56] References Cited

U.S. PATENT DOCUMENTS

| | | | |
|---|---|---|---|
| 1,273,834 | 7/1918 | Dumanois | 123/53 A |
| 3,623,463 | 11/1971 | Vries | 123/70 R |
| 4,159,699 | 7/1979 | McCrum | 123/59 EC |

FOREIGN PATENT DOCUMENTS

| | | | |
|---|---|---|---|
| 677041 | 3/1930 | France | 123/188 VA |
| 24571 | of 1907 | United Kingdom | 123/59 EC |

*Primary Examiner*—Craig R. Feinberg

*Attorney, Agent, or Firm*—Stanley G. Ade

[57] ABSTRACT

Each pair of piston and cylinders is twinned so that one acts as a primary or master piston and cylinder and the other as a secondary piston and cylinder. The pistons move in unison through the conventional four strokes of the Otto cycle. A transfer valve assembly is fitted into the head of the master cylinder and is ported to the secondary cylinder. It is adjustable so that it opens only when the power stroke is initiated and the pressure rises well above the compression pressure. When the transfer valve opens, the expansion takes place in both cylinders under any one of three conditions. (a) Inlet valve of the secondary cylinder is closed and sealed so that a vacuum is present as the piston descends. (b) The inlet valve of the secondary cylinder is operated to admit a restricted volume of air/fuel mixture to improve efficiency or (c) the inlet valve of the secondary cylinder is operated to admit a full charge of stratified lean air/fuel mixture which normally would not ignite but will be ignited by the high temperature gases transferred from the master cylinder.

4 Claims, 5 Drawing Figures

INTERNAL COMBUSTION ENGINES

BACKGROUND OF THE INVENTION

This invention relates to new and useful improvements in internal combustion engines, particularly to the efficiency of the conventional air/fuel mixture which is normally in the neighborhood of 12 to 16 to 1 by volume.

Even under optimum operating conditions, it is usually not possible to operate at more than 25 to 28 percent efficiency, the remaining power being lost due to friction, heat, and general inefficient burning conditions. The heat losses are absorbed by the cooling system and inefficient burning is absorbed in the exhaust system and discharged into the atmosphere with the subsequent pollution problems.

It has long been recognized that if only a small increase in percentage efficiency could be obtained, then fuel economy would be improved and exhaust emissions also would be improved. Prior art devices have attempted to improve the operating conditions and included U.S. Pat. No. 2,091,413 in which a rich mixture is injected under comparatively high pressure into a cylinder containing air. U.S. Pat. No. 2,154,856 shows a pair of cylinders which are in constant communication with each other through a common combustion chamber and the pistons are connected to a common crank shaft but are so arranged that one piston leads the other. This of course intends to provide an unbalanced engine.

U.S. Pat. No. 3,866,582 shows pairs of cylinders operating together with a common exhaust valve and constant communication between the two cylinders. U.S. Pat. No. 3,200,799 operates on a modified Atkinson cycle characterized in that the expansion ratio exceeds the compression ratio. It teaches the use of a pair of cylinders in which a charge is induced and partially compressed in one cylinder but finally compressed in the two cylinders into a common combustion chamber. U.S. Pat. No. 2,196,228 shows a pair of cylinders but the pistons move in different directions and one piston is larger than the other and finally U.S. Pat. No. 2,255,925 relates to a two stroke multi-stage engine which includes first and second stages with a small charge and with a running as is the case in a two-stroke single stage internal combustion engine of usual construction.

The present invention overcomes the above mentioned disadvantages and disadvantages inherent in the prior art devices and in accordance with the invention there is provided an internal combustion engine operating on the Otto cycle and including intake, compression, expansion and exhaust strokes. It comprises at least one pair of piston and cylinder assemblies which includes combustion chambers and cylinder heads in side by side relationship and which constitute a master piston and cylinder assembly and a secondary piston and cylinder assembly. An inlet and an exhaust valve is provided in the master piston and cylinder assembly and at least an exhaust valve is provided in the secondary piston and cylinder assembly. Means are provided whereby the pistons of the master and secondary piston and cylinder assemblies reciprocate in side by side relationship concurrently and a transfer valve assembly extends between the combustion chambers of the master and secondary piston and cylinder assemblies. The transfer valve assembly is situated in the combustion chamber of the master piston and cylinder assembly and adjustable means normally maintain the transfer valve assembly closed below a predetermined pressure within the master combustion chamber which is in excess of the compression pressure generated therein.

Another aspect of the invention contemplates the provision of an inlet valve in the secondary piston and cylinder assemblies which may be operated to introduce either a limited charge of air/fuel mixture of approximately the same ratio as the conventional air/fuel ratio or, alternatively, may introduce a charge of air/fuel mixture which is much leaner than normal and which normally would not ignite under normal compression ratios utilized. However, because of the transfer valve assembly being opened at this time, the high temperatures of the burning air/fuel mixture within the master piston and cylinder assembly is sufficient to ignite the lean mixture in the secondary piston and cylinder assembly once again adding to the efficiency of the operation of the engine.

Still another aspect of the invention is to provide a device of the character herewithin described which can be incorporated in an existing engine with the minimum of modification being required.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
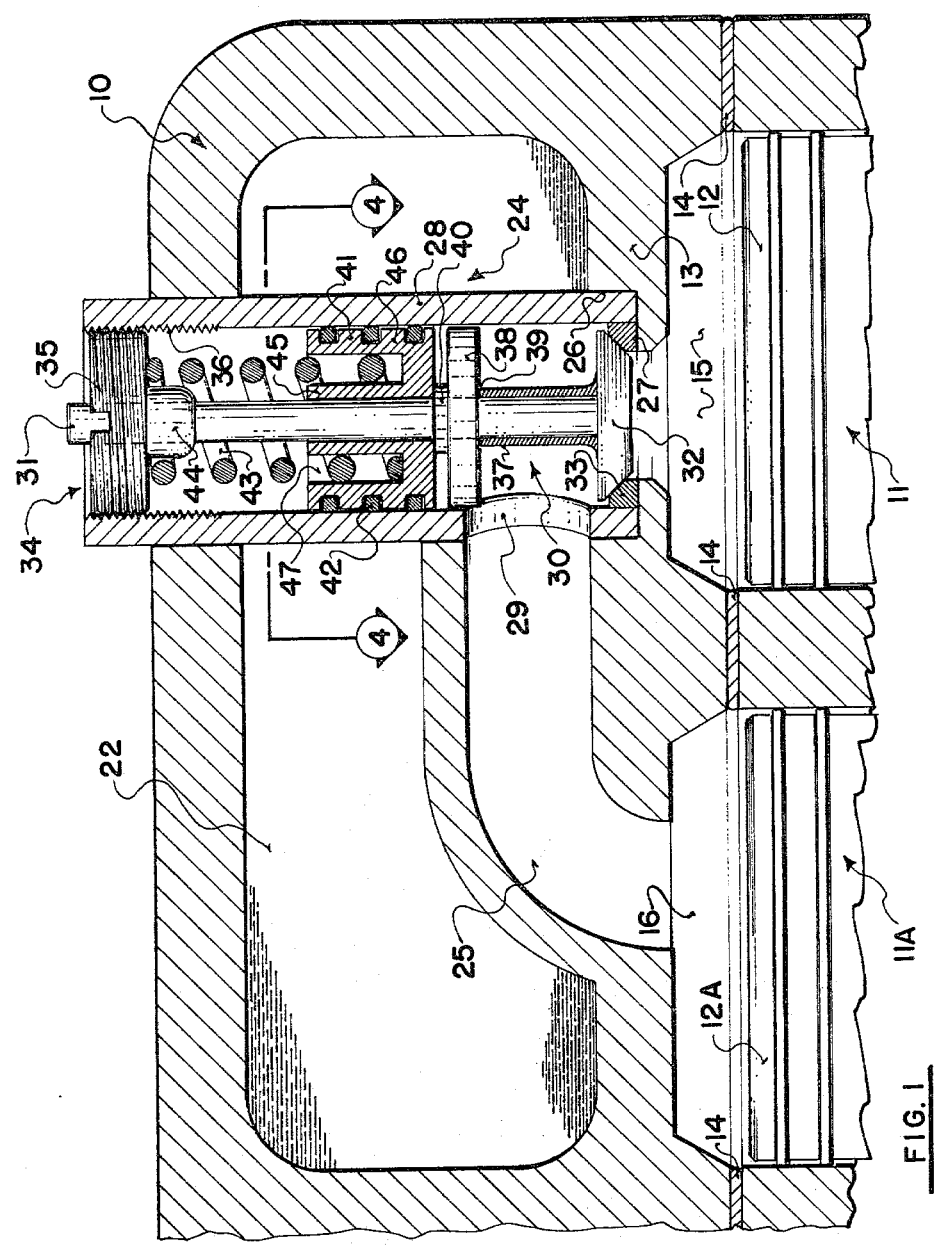
FIG. 1 is a fragmentary partially schematic cross sectional view of the upper end portion of a pair of piston and cylinder assemblies.

Before proceeding with a description of the invention, it should be appreciated that in normally operating four cycle engine, the geometry is such that the expansion stroke is the same length as the compression stroke. In order to obtain an efficiently operating engine, it is therefore normal for the exhaust valve to open and the exhaust stroke to commence prior to full expansion of the gases in the expansion stroke to atmospheric pressure. It will be appreciated that if more of the pressure within the expansion stroke could be utilized, then a greater efficiency would be obtained.

However, under normal operating conditions, it is not possible to utilize all of the pressure within the expansion stroke so that the portion not used, assists in scavaging the cylinders on the exhaust stroke under which circumstances unburned fuel as well as combustion gases are expelled into the atmosphere which also adds to the polluting emissions from the conventional engine.

In the present device, the transfer valve opens during the expansion stroke, thus enabling the pressure generated on the expansion stroke to act on two pistons rather than one so that a larger amount of the pressure generated on the expansion stroke, may be utilized as useful work without the mechanical awkwardness of increasing the length of the expansion stroke relative to the compression stroke.

Proceeding therefore to describe the invention in detail, reference character 10 illustrates part of an internal combustion engine including a pair of cylinders 11 and 11A in side by side relationship.

Although only two such piston and cylinder assemblies are illustrated, nevertheless it will be appreciated that, for example, in an eight cylinder engine, four such pairs will be useable.

The cylinder 11 includes a piston 12 of conventional construction reciprocating therein together with a cylinder head 13 secured thereto and separated by means of a compression gasket 14 thereby defining a combustion chamber 15 and the cylinder 11, piston 12, combustion chamber 15 and part of the cylinder head 13 constitutes a master piston and cylinder assembly.

The cylinder 11A also includes a piston 12A reciprocal therein and includes a portion of the cylinder head 13 defining an expansion chamber 16 similar in configuration to the combustion chamber 15 and the cylinder 11A, piston 12A, cylinder head portion 13 and expansion chamber 16 constitute a secondary piston and cylinder assembly in side by side relationship with the master piston and cylinder assembly.

Figure 5:
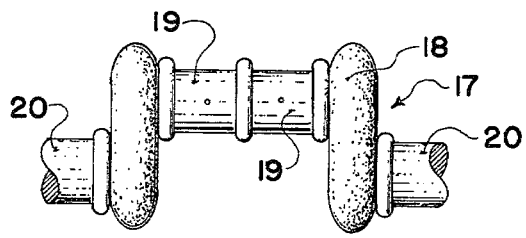
FIG. 5 is a fragmentary side elevation of part of a crank shaft showing means whereby the pair of piston and cylinder assemblies reciprocate concurrently.

The reference to FIG. 5 will show that the crank shaft 17 is modified so that the crank throw 18 includes a pair of side by side crank pins 19 offset from the main bearing pins 20 and that the connecting rods (not illustrated) extending from the side by side pistons 12 and 12A, are connected to the crank pins 18 so that the two pistons reciprocate concurrently in side by side relationship.

Figure 2:
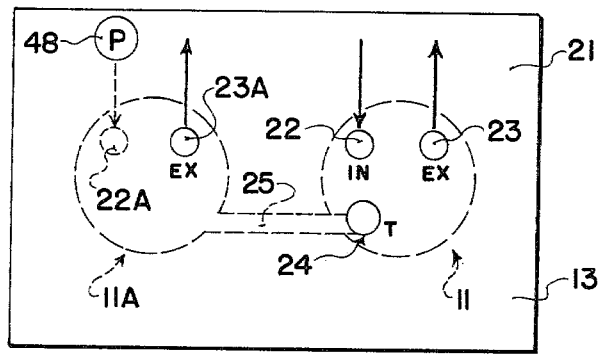
FIG. 2 is a partially schematic top plan view of the cylinder head of FIG. 1.
Figure 3:
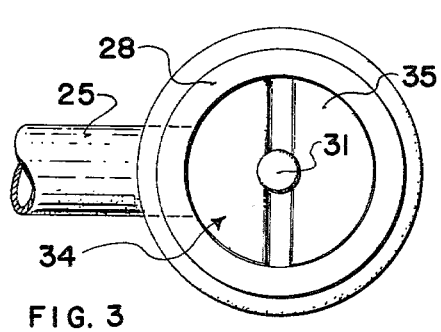
FIG. 3 is a top plan view of the transfer valve assembly per se.
Figure 4:
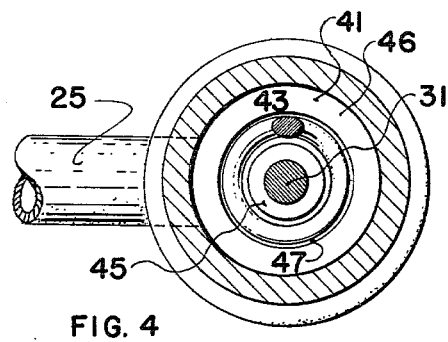
FIG. 4 is a cross sectional view of the transfer valve assembly substantially along the line 4—4 of FIG. 1.

Reference to FIG. 2 shows the other side 21 of the cylinder head 13 spaced from the portion above the combustion and expansion chambers by the water jacket areas 22 as is conventional.

The master piston and cylinder assembly includes a conventional inlet valve illustrated schematically by reference character 22, and a conventional exhaust valve illustrated schematically by reference character 23.

The secondary piston and cylinder assembly includes an exhaust valve 23A which is conventional and may include an inlet valve shown schematically by reference character 22A as will hereinafter be described.

Communication between the combustion chamber and the expansion chamber is by means of a transfer valve assembly collectively designated 24 and which is situated in the cylinder head portion 13 above the combustion chamber 15 of the master piston and cylinder assembly which may also be identified by reference character 11. It includes a transfer port or conduit 25 which communicates with the expansion chamber 16 of the secondary piston and cylinder assembly which may also be identified by reference character 11.

In detail, a cylindrical shouldered recess 26 is formed in the lower portion 13 of the combustion chamber 15 having an annular shoulder 27 at the base thereof and a cylindrical sleeve or housing 28 is either press fitted or screw threaded into this cylindrical recess as clearly shown.

An aperture 29 in one side of the wall of the housing 28 is connected to the port 25 as shown in FIG. 1 and this port extends through the lower portion 13 of the cylinder head and into the expansion chamber 16.

A valve collectively designated 30 includes a valve stem 31 extending upwardly from a poppet type valve head 32 which engages with a valve seat 33 either secured to the base of the housing 28 or press fitted or screw threaded separately therein. Valve guide means collectively designated 34 take the form of an apertured screw threaded cylindrical portion 35 screw threadably engageable within the screw threaded upper end 36 of the cylindrical housing 28 and the valve stem 31 extends therethrough and is guided for reciprocal motion.

Upon the lower portion of the stem just above the valve head 32, is a shouldered portion 37 and a cylindrical fire shield portion 38 rests upon the upper end 39 of this shoulder and includes a spacer 40 on the upper side thereof.

A piston 41 reciprocal within the cylindrical housing 28, engages around the valve stem 31 and rests upon the spacer 40 and piston rings 42 are provided to seal the area below the piston, from the area above.

A compression spring 43 surrounds the valve stem and engages within the piston as clearly shown and also surrounds a spring guide portion 44 on the lower end of the guide means 34. The piston is hollow and includes the central cylindrical portion 45 and the outer cylindrical portion 46 and the spring 43 engages within the annular recess 47 defined therebetween.

It will be appreciated that by adjusting the screw threaded guide means 34 within the screw threaded upper end 36 of the housing, the effective pressure of spring 43 may be controlled and hence the effective pressure acting upon the valve head 32 normally maintaining it in sealing relationship with the valve seat 33.

However, when the spring pressure is exceeded, the valve stem will move upwardly within the guide means 35 so that the valve head 32 moves from the seat 33 thus communicating the combustion chamber 15 within the expansion chamber 16.

In operation, and under the first method of operation, the inlet valve 22A is either removed or is inoperative. The crank shaft rotating in the normal way moves the piston 12, together with piston 12A downwardly upon an inlet stroke and the inlet valve 22 opens thus allowing a conventional fuel/air mixture to enter the cylinder 11. This may be supplied by a carburettor (not illustrated) in the usual manner.

As the two pistons move downwardly, the secondary piston will draw a vacuum because both the inlet and exhaust valves of this piston and cylinder assembly are closed.

The pistons move upwardly on a compression stroke with the piston 12 compressing the mixture in the combustion chamber and at the appropriate time, ignition takes place by means of a conventional spark plug (not illustrated) thus initiating flame propagation and commencing the expansion stroke.

Up until this point, spring 43 is strong enough to maintain the valve 30 upon seat 33.

However, as the pistons commence moving downwardly on the expansion stroke, the excess pressure generated by the expansion process, is sufficient to overcome the pressure of spring 43 so that valve 30 opens and part of the expanding charge from combustion chamber 15 transfers through porting 25 to the expansion chamber 16 so that the expansion power generated operates on both pistons driving them downwardly and utilizing a greater degree of the effective pressure during the expansion stroke. As the pistons return on the exhaust stroke, both exhaust valves 23 and 23A open but at the beginning of the exhaust stroke, the pressure within both cylinders is close to atmosphere as the expansion has taken place over both pistons.

In the second method of operation, the inlet valve 22A may be operated by a modified cam on the cam shaft (not illustrated) to open for a relatively short period thus introducing a controlled charge of air/fuel mixture which, of course, will be ignited as soon as the transfer valve 30 opens thus adding additional power to the expansion stroke of the two pistons.

In the third method of operation, the inlet valve 22A may be opened either for a relatively short time or for a full period similar to valve 22 in order to admit a full charge of air/fuel mixture which is extremely lean (it may be in the neighborhood of 50 to 1). Normally this would not ignite but due to the high temperatures of the gases transferring through valve 30, they are readily ignited and once again assist in the expansion process of the two piston and cylinder assemblies.

It will, of course, depend upon design parameters as to what method is used and what percentages of additional charge may be introduced to the secondary piston and cylinder assembly.

If desired, the charges entering the expansion chamber 16 from inlet valve 22A may be assisted by a vane type pump 48 if desired.

For low power requirements, the secondary cylinders may be controlled by a valve (not illustrated) on the carburetor or manifold to stop or control the flow of air/fuel mixture to make the secondary cylinders inoperable insofar as adding additional power is concerned thus resulting in a saving of gasoline. Also the secondary cylinders may be used for compressing air only for supercharging the main cylinders.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An internal combustion engine operating on the Otto cycle and including intake, compression, expansion and exhaust strokes, comprising in combination at least one pair of piston and cylinder assemblies including combustion chambers and cylinder heads, situated in side by side relationship and constituting a master piston and cylinder assembly and a secondary piston and cylinder assembly of similar dimensions, an inlet and an exhaust valve in said master piston and cylinder assembly, at least an exhaust valve in said secondary piston and cylinder assembly, means whereby the pistons of said master and secondary piston and cylinder assemblies reciprocate concurrently, and a transfer valve assembly operatively extending between the combustion chambers of said master and secondary piston and cylinder assemblies, said transfer valve assembly being situated in the combustion chamber of said master piston and cylinder assembly and adjustable means normally maintaining said transfer valve assembly closed below a predetermined pressure within said master cylinder combustion chamber, in excess of the compression pressure generated therein, said transfer valve assembly including a valve seat in the cylinder head of said master piston and cylinder assembly, a valve engageable thereon, means mounting said valve for reciprocal motion relative to said seat, said means normally maintaining said transfer valve assembly closed, comprising a compression spring, said valve assembly in including a valve head engageable with said valve seat and a valve stem extending therefrom, a housing extending from said cylinder head, guide means in said housing mounting said stem for reciprocal action in said housing, and a valve piston reciprocal in said housing operatively connected to said stem, said spring reacting between said housing and said valve piston to control the pressure of said valve means upon said valve seat, wherein said valve stem further which includes a substantially flat cylindrical flame guard secured to said valve stem and spaced from said valve head below said valve piston and above said valve head, said flame guard spanning said housing thereby sealing off and protecting said valve piston reciprocal in said housing.

2. The device according to claim 1 which includes means to adjust the effective pressure of said spring relative to said valve, said last mentioned means including said guide means being screw threadably engageable within said housing and adjustable lengthwise therein.

3. The device according to claim 1 which includes an inlet valve in said secondary piston and cylinder assembly.

4. The device according to claims 1 or 2 which includes means to adjust the effective pressure of said spring relative to said valve, said last mentioned means including said guide means being screw threadably engageable within said housing and adjustable lengthwise therein.

* * * * *